United States Patent [19]

Liautaud

[11] 4,322,585
[45] Mar. 30, 1982

[54] PERSONAL ELECTRONIC LISTENING SYSTEM WITH AN AIR AND BONE TRANSDUCER MOUNTED ON THE CLOTHING COLLAR

[76] Inventor: James P. Liautaud, River and Bluff Rds., Cary, Ill. 60013

[21] Appl. No.: 146,759

[22] Filed: May 5, 1980

[51] Int. Cl.³ ............................................. H04M 1/04
[52] U.S. Cl. .................................................. 179/157
[58] Field of Search ............................ 179/146 R, 157

[56] References Cited

U.S. PATENT DOCUMENTS 2,673,898  3/1954  Reichert .......................... 179/107 R
4,070,553  1/1978  Hass ..................................... 179/157

FOREIGN PATENT DOCUMENTS 1098553  1/1968  United Kingdom ................ 179/157

OTHER PUBLICATIONS

*Ski*, Dec. 1979, p. 154, Advertisement for "Stereo Porta Pack".

*Popular Electronics*, Feb. 1980, p. 7, Advertisement for "Bone Fone".

Primary Examiner—George G. Stellar
Attorney, Agent, or Firm—Hill, Van Santen, Steadman, Chiara & Simpson

[57] ABSTRACT

A personal electronic listening system is disclosed wherein miniature moisture-protected speakers are electrically connected for operation to a personal electronic unit such as a stereo attached to the wearer by a belt, for example. The speaker units have pins projecting therefrom which serve to mount the speaker units in the vicinity of the wearer's ears by penetration of the pins through an article of clothing on the wearer in the vicinity of his ears. A corresponding clip engages the pin after penetration of the clothing. The pins are electrically connected to the speaker and a cable from the personal electronic unit connects to these pins via the engagement clips. The pins perform the dual function of mounting the speaker and also providing electrical connection thereto.

3 Claims, 7 Drawing Figures

U.S. Patent    Mar. 30, 1982    4,322,585
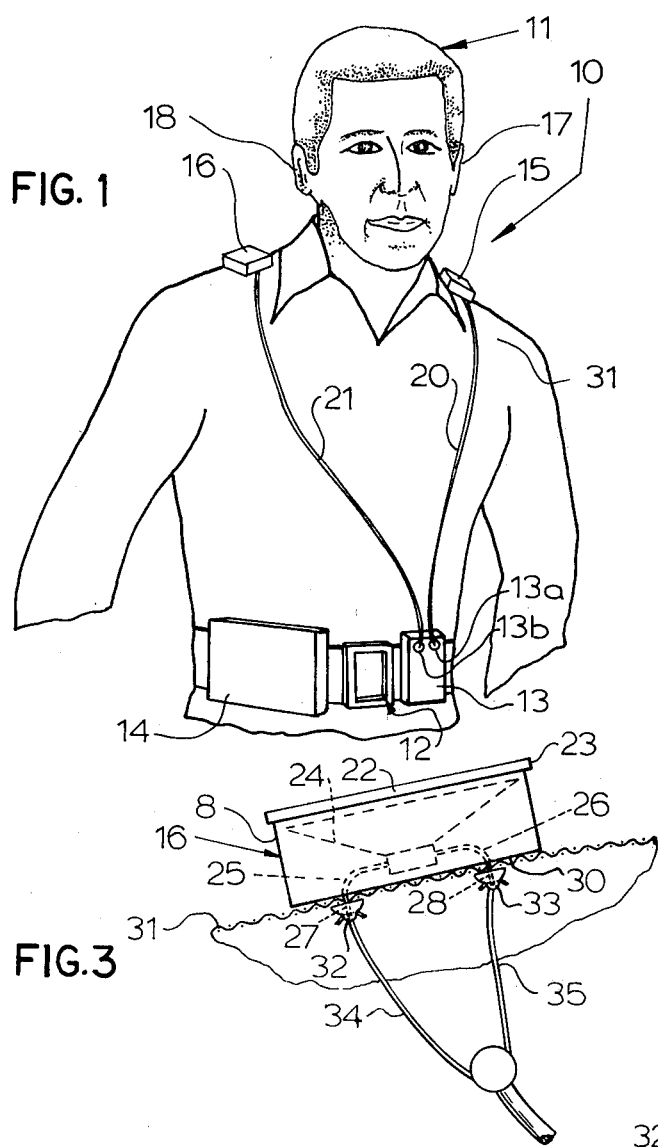
FIG. 1
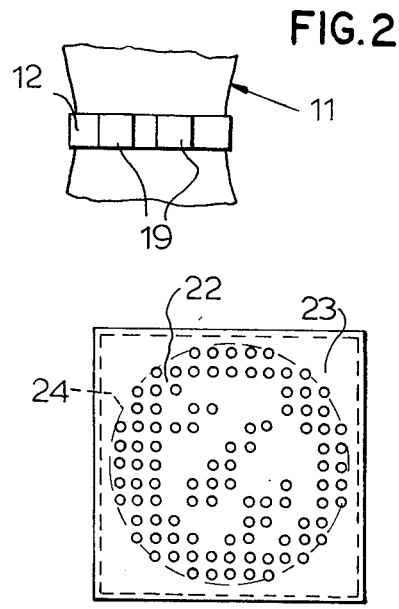
FIG. 2
FIG. 4
FIG. 3
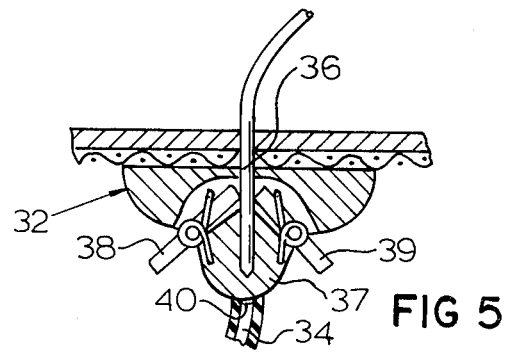
FIG 5
FIG. 6
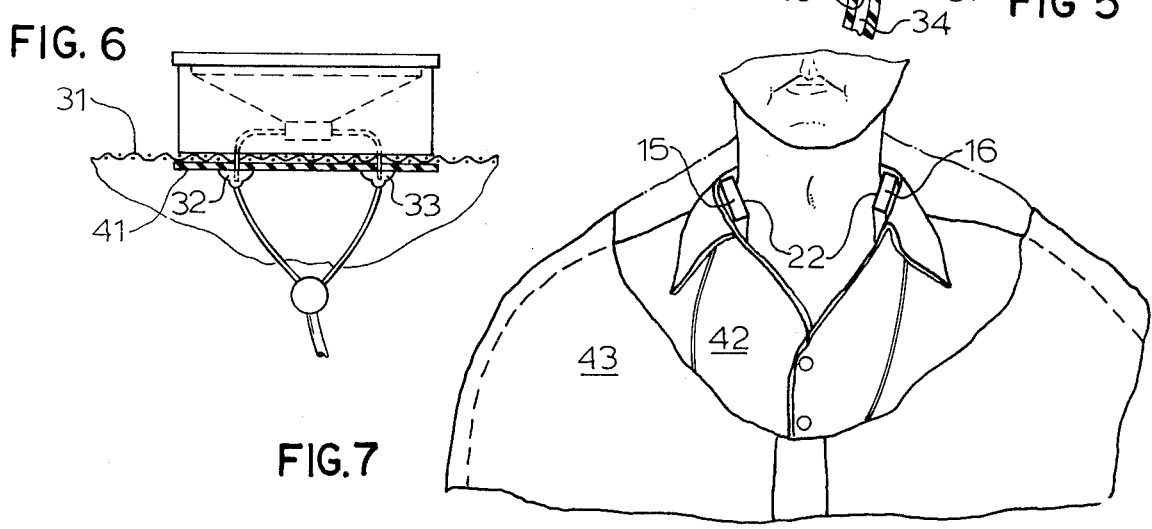
FIG. 7

PERSONAL ELECTRONIC LISTENING SYSTEM WITH AN AIR AND BONE TRANSDUCER MOUNTED ON THE CLOTHING COLLAR

BACKGROUND OF THE INVENTION

The use of personal electronic sound systems has become popular during such activities as skiing, boating, bicycling, during sports events, etc. Typically, the user has a radio such as a stereo AM/FM or a stereo tape player attached by straps to his body. Earphones are then worn by the user which are connected to the electronic sound system. Also, it has been known to provide a sound system which is formed as a belt which is laid around the neck of the user.

Such systems are cumbersome and heavy. Also, they are relatively unattractive physically and subsequently effect the marketing of the product. Also, when earphones are employed, others desiring to talk to the user may have difficulty being heard. Furthermore, if two individuals are located in close proximity to one another, it may be desirable for simultaneous listening. The use of earphones, however, renders such simultaneous listening impractical.

It is an object of the invention to provide a personal electronic sound system which is attractive, light in weight, and permits simultaneous listening by two individuals in close proximity to one another, yet without interfering with other individuals in the surrounding area.

It is another object of this invention to provide a sound transducer which may be easily positioned adjacent a user's ears.

It is a further object of this invention to provide a sound transducer which may be positioned to allow sound transfer from the transducer at least partially by bone conduction.

According to the invention, a transducer unit for a personal electronic sound system is provided which has a protective enclosure and a sound transducer mounted therein. At least one pin means projects from and is supported by the protective enclosure for penetration through an article of clothing of a user and also for providing an electrical connection from the speaker through the article of clothing. Means are provided for engaging the pin means after penetration through the clothing to thereby secure the enclosure in position on the clothing and also provide electrical connection for operation on the sound transducer.

Preferably the user employs a belt strapped about his waist with a series of rechargeable batteries mounted in multiple pockets at the back thereof and appropriate electronic devices such as a stereo radio and/or a tape player attached at other areas of the belt and electrically connected to the batteries. Cables then connect one or more of the transducer units to the appropriate electronic sound unit. Preferably, a transducer unit in the form of a miniature speaker in a moisture-proof enclosure is mounted adjacent each of the user's ears.

BRIEF DESCRIPTION OF THE DRAWINGS

FIG. 1 is a front view of a personal electronic sound system of the invention worn by a user;

FIG. 2 is a rear view of a belt worn by the user for carrying batteries;

FIG. 3 is a side view of one of two speaker units mounted adjacent the user's ears in FIG. 1;

FIG. 4 is a top view of the speaker unit of FIG. 3;

FIG. 5 is a side view of a connection clip for engagement of a pin protruding from the speaker unit of FIG. 3;

FIG. 6 is a side view of an alternate embodiment of the clips for engaging the pins of the speaker unit shown in FIG. 3; and FIG. 7 is a side view of a user having the speaker units shown in FIG. 1 mounted for at least partial transmission of sound to the user by bone conduction.

DESCRIPTION OF THE PREFERRED EMBODIMENTS

A personal electronic sound system of the invention is generally shown at 10 in FIG. 1. A listener or user 11 wears a belt 12 about his waist. Electronic sound producing devices are mounted at the front of the belt and include a stereo 13 having left and right channel outputs 13a and 13b, and also an additional electronic device 14 such as a cassette player, etc. As shown in FIG. 2, the back portion of the belt preferably has batteries 19 attached thereto.

As shown in FIG. 1, miniature transducer or speaker units 15 and 16 are positioned in the vicinity of the right and left ears 17, 18 of the user. A cable 20 and a cable 21 respectively attached to the transducer units 15 and 16 and plug into the left and right channel outputs 13a, 13b of the stereo unit 13.

With reference to FIGS. 1, 3, 4 and 5, the specific construction of the transducer units will now be explained. A box-shaped moisture-proof enclosure is provided within which a miniature speaker 24 is mounted to a front face 22. The front face 22 preferably is apertured and has a moisture-proof covering 23 thereover which permits the transmission of sound therethrough. First and second speaker wires 25 and 26 connect the speaker voice coil to respective pins 27, 28. Pins or posts 27, 28 are preferably tapered or pointed to permit penetration through an article of clothing. The back portion 30 of the moisture-proof enclosure 8 has the pins 27, 28 projecting therefrom. The pins may be mounted thereto in any well known fashion such as by molding or other technique.

The transducer unit 16 is mounted in the vicinity of the user's ear to his clothing such as a sweater, tee shirt, shirt, or the like. After the pins 27 and 28 are pushed through the clothing, respective retaining clips 32, 33 are slid over the ends of the pins in well-known fashion. Such retaining clips preferably have a bell-shaped structure so as to cover the pointed end of the pin and protect the user. Those skilled in the art will recognize that many types of retaining clips may be employed.

The retaining clips 32, 33 as is the case of the pins 27 and 28, are all constructed of an electrically conductive material. Cable 21 connecting to the speaker unit 16 has first and second conductors 34, 35 which are respectively soldered to the retaining clips 32, 33 such as shown at 40 in FIG. 5.

As further shown in FIG. 5, the engagement or retaining member 32 has a central pin receiving aperture 36 and an outer bell-shaped casing 37. Finger release tabs 38, 39 are provided in well known fashion. Mechanical details for the engagement member 32 or 33 may vary since these types of clipping members are well known.

In an alternate embodiment shown in FIG. 6, a mounting plate 41 may be provided to which the retaining clips 32, 33 are mounted such as by molding, glueing, etc. Of course, the mounting plate 41 should be insulated to permit electrical separation of the clips 32, 33.

A further alternate embodiment of the invention is illustrated in FIG. 7 where at least partial bone conduction is employed for sound transmission. Excellent stereo separation effects can be obtained by employing at least partial bone conduction wherein the speaker units 15, 16 are pressed against a portion of the body of the user such as at the neck or shoulder. At least partial mechanical sound transmission then occurs to the inner ear of the user via his bones. As shown in FIG. 7, the user may attach the speaker units 15, 16 to the inside collar of a shirt 42. If a coat 43 is then worn thereover, the speaker units will be pressed against the body of the user to permit mechanical sound transmission.

Although various minor modifications may be suggested by those versed in the art, it should be understood that I wish to embody within the scope of the patent warrented hereon, all such embodiments as reasonably and properly come within the scope of my contribution to the art.

I claim as my invention:

1. A method for providing sound to ears of a wearer of a portable personal electronic sound system, comprising the steps of:
   providing a sound transducer unit having a protective enclosure with a sound transducer mounted therein and at least one pin projecting therefrom electrically connected to the sound transducer;
   mounting the transducer unit by pushing the pin through an article of clothing worn by the user at a vicinity of the user's ear and such that if a coat is worn over the article of clothing a portion of the enclosure is pressed against a portion of the body of the user for at least partial bone conduction of the sound to the ears;
   providing an electrically conductive engagement member for engaging the pin projecting through the clothing, said engagement member having an electrical cable connected thereto;
   placing the engagement member on the pin to secure the transducer unit to the clothing;
   routing the cable to the electronic sound system; and
   connecting an end of the cable to the sound system for operation of the transducer unit.

2. A method for providing sound by partial bone conduction to ears of a wearer of a portable personal electronic sound system, comprising the steps of: providing the wearer with an article of clothing having an upper portion adjacent a neck of the wearer; mounting the portable personal electronic sound system externally to said article of clothing; providing a speaker mounted within a protective enclosure which has a pin projecting from a rear wall of the enclosure and wherein the speaker projects sound through a front wall of the enclosure opposite the rear wall; mounting the enclosure to said article of clothing such that the front wall of the enclosure lies adjacent to and directly faces the neck of the wearer while the pin penetrates the upper portion of the article of clothing such that an interior surface of the article of clothing lies against said rear wall; providing a wire which connects the sound system to the speaker, said wire having an electrically conductive clip which cooperates with said pin; routing the wire from the sound transducer exterior to said article of clothing and connecting the clip to the pin.

3. A personal electronic sound system, comprising: a wearer having an article of clothing with an upper portion adjacent a neck of the wearer; a portable sound system mounted on the wearer exteriorly of said article of clothing; a protective enclosure having a speaker mounted therein, a front wall of the enclosure having means for transmission of sound from the speaker therethrough and a rear wall of the enclosure having a mounting pin which is electrically connected to electrical terminals of the speaker; a connection wire attached to the sound system at one end and having at its other end an electrically conductive clip designed to cooperate and engage with the pin on the speaker enclosure; the speaker enclosure being mounted such that its front wall is adjacent to and directly faces the neck of the wearer and its pin penetrates through the upper portion of the article of clothing with an interior surface of the article of clothing lying against the rear wall of the enclosure; and the speaker wire being positioned exteriorly of the article of clothing and running from the sound system to a connection defined by the clip in mechanical and electrical contact with the pin so as to secure the speaker enclosure in position while simultaneously making electrical contact to the speaker.

* * * * *